June 18, 1929.  E. F. ANDREWS  1,717,488
ELECTROLYTIC CONDENSER
Filed Feb. 26, 1927
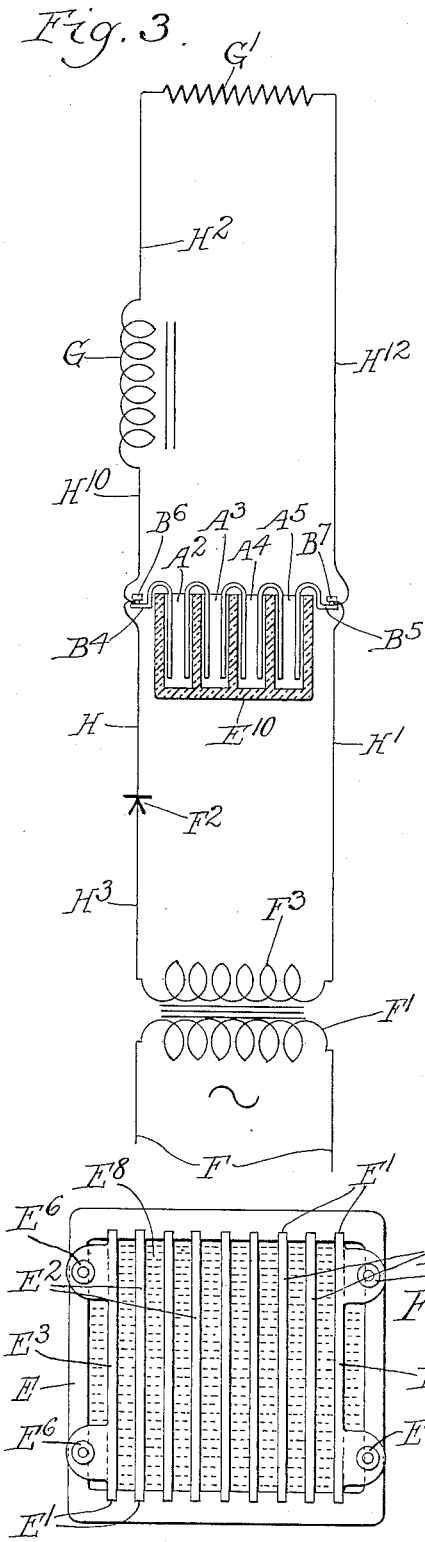
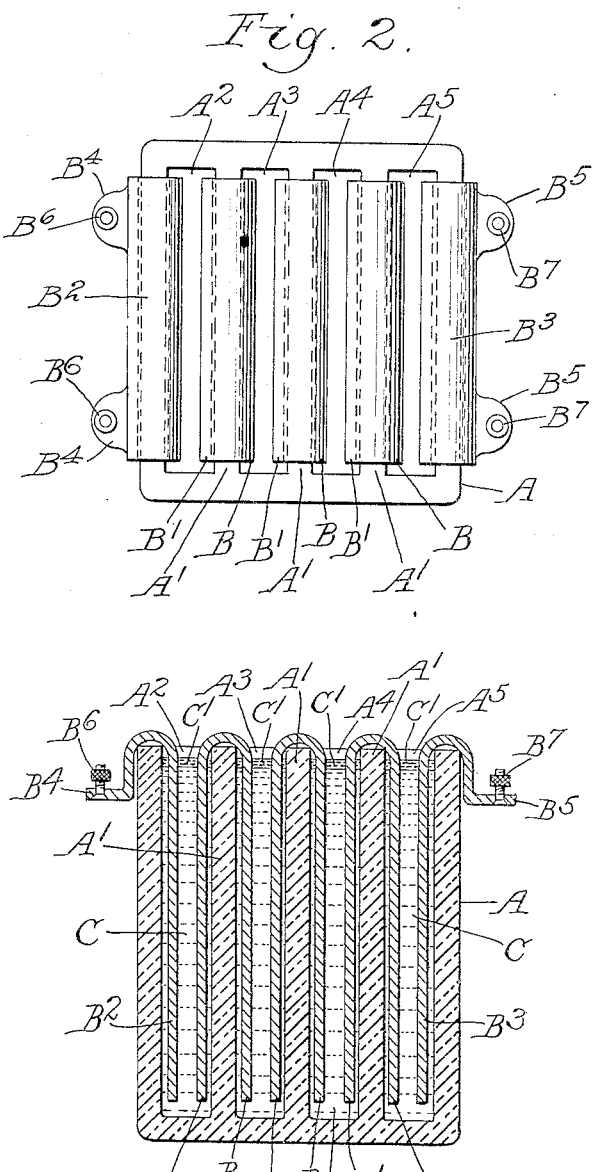
Inventor
Edward F. Andrews
by Parker + Carter
Attorneys.

Patented June 18, 1929.

1,717,488

UNITED STATES PATENT OFFICE.

EDWARD F. ANDREWS, OF CHICAGO, ILLINOIS, ASSIGNOR TO ANDREWS-HAMMOND CORPORATION, OF CHICAGO, ILLINOIS, A CORPORATION OF ILLINOIS.

ELECTROLYTIC CONDENSER.

Application filed February 26, 1927. Serial No. 171,137.

My invention relates to an electrolytic condenser, of the same general type as that disclosed in my prior application 101,347, filed April 12, 1926, which makes possible enormously greater capacity than previous types of condenser, of similar dimensions, particularly at relatively low voltages. By an electrolytic condenser I mean a cell having two or more electrodes and an electrolyte which substantially blocks the flow of direct current through it below a certain potential difference between its electrodes and which functions as a condenser. One object of my invention is to provide an electrolytic cell adapted to function as a condenser in circuits carrying pulsating, alternating or surging currents, which shall have a relatively high capacity, particularly at low voltages, which shall be capable of receiving a complete charge and of discharging completely almost instantaneously and which shall be capable of long periods of use or disuse with a minimum deterioration. A further object is the provision of an electrolytic condenser, one or more of which may be used in connection with one or more inductances, in circuits carrying alternating or pulsating current, to reduce the alternating or pulsating component to a minimum, thus producing a substantially steady direct current. Another object is the provision of an electro-chemical condenser in which the internal resistance is reduced to a minimum. A further object is the provision of an electrolytic condenser which shall be easy and cheap to manufacture and economical to use.

Other objects will appear from time to time in the course of the specification and claims.

I illustrate my invention more or less diagrammatically in the accompanying drawings, wherein—

Figure 1 is a cross-section of one of my electro-chemical condensers;

Figure 2 is a plan view of the condenser shown in Figure 1;

Figure 3 illustrates one of my electro-chemical condensers connected across a circuit carrying pulsating current; and Figure 4 illustrates a variant and on the whole preferred type of condenser.

Like parts are indicated by like symbols throughout the specification and drawings.

Referring to Figures 1 and 2, the container A is divided by the transverse partitions $A^1$ into separate compartments or cells, $A^2$, $A^3$, $A^4$, $A^5$. Each cell is provided with a negative electrode B and a positive electrode $B^1$. The positive and negative electrodes of adjacent cells may be made continuous. Thus I have illustrated in Figure 1 combined positive and negative electrodes, U-shaped in cross section, with the transverse partitions $A^1$ positioned between the arms of the U and supporting the electrodes in position. Since the positive and negative electrodes are preferably of different metals, the dissimilar metals may be welded together or may be fastened together in any other manner which would produce a low resistance connection. If desired the electrodes may be formed of a central body of any suitable material, the surface of the positive and negative portions being plated with the desired metals. It may consist, for example, of an iron body, with that portion which constitutes the positive portion plated with nickel.

The end electrodes $B^2$ and $B^3$ are in Figures 1 and 2 illustrated as single and are provided with the terminals $B^4$ $B^4$, $B^5$ $B^5$, which should be formed to permit of an extremely low resistance connection between the circuit and the condenser. I illustrate the binding posts as $B^6$ and $B^7$.

C indicates the electrolyte which consists preferably of an aqueous solution of potassium hydroxide, for example of a 10 per cent solution. It is desirable that the solution be quite pure, and the presence of chlorides in the electrolyte must be particularly avoided, as tending to cause corrosion of the electrodes. Any suitable electrolyte which has a low resistance and does not attack the electrodes or metals employed may be used.

$C^1$ indicates a thin film of oil floating on the surface of the elctrolyte C, which serves to prevent the electrolyte from absorbing carbon dioxide from the air, and also retards evaporation. If the container A is provided with a closed top as is preferable in commercial application of my device, the oil film $C^1$ may generally be omitted.

The effective surface of the positive electrode is preferably of metallic nickel, and the effective surface of the negative electrode may be of metallic iron or other suitable metals. Iron is efficient and cheap. So far as relates to the operation of the device it is immaterial whether a relatively thin surface layer of nickel is employed or whether the positive electrode is entirely of metallic nickel. The necessity I wish to emphasize is that the effective surface of the positive electrode is of nickel or contains an effective percentage of metallic nickel.

Referring to Figure 2 the compartments $A^2$, $A^3$, $A^4$, $A^5$, are preferably long and narrow, to bring the positive and negative electrodes B, $B^1$ close together and thus to reduce the internal resistance of the cell, and at the same time to provide accommodation for plates of suitable area. The capacity and smoothing effect increases with the plate area. The thickness of the electrodes is limited by the necessity of having them thick enough to be strong and durable, and in the case of those to which connections are made, they must be thick enough to provide ample conductivity. For larger capacities a plurality of electrodes can be connected in parallel in the same cell.

Referring now to Figure 4 I illustrate a variant form of condenser which is thought to be preferable for certain commercial use. This general type of cell is that described shown and claimed in the co-pending application 153,488, of Laurens Hammond, filed on December 9, 1926. E indicates a container the inner faces of the sides of which are slotted in parallel as at $E^1$ to receive the metallic sheets $E^2$ which serve at the same time as partitions between adjacent cells, as electrodes for the cells they bound and as conductors connecting the adjacent electrodes. Thus, save for the terminal plates $E^3$ and $E^4$, each plate serves as the positive electrode for one cell and the negative electrode for the adjacent cell. $E^6$ $E^7$ indicate binding posts or any other suitable connecting means for the terminal plates $E^3$ and $E^4$. Since I wish the positive electrode of each cell to be of nickel, and the negative electrode may be made of iron, I may employ sheet iron for the electrodes with a nickel coating on one side, this being a cheap and convenient method of associating the two metals. The nickel may be applied by electro-plating or otherwise, or thin sheets of iron and nickel may be welded or otherwise secured together. The metals, however joined, must closely adhere so that they will not separate or peel off under the electrolytic action. Whereas I prefer the combination of a nickel positive electrode and an iron negative electrode, the use of a nickel positive is the most essential element of the invention. Nickel in alkaline electrolytes is more passive than the other metals of the iron group and therefore is acted on to a smaller extent electrolytically. It is highly desirable to have a positive electrode which will not dissolve anodically or continue to oxidize. The negative electrode does not tend to dissolve to as great an extent as the positive at least not while the cell is in operation, and therefore a wider range of metals is available for such use. They must of course not be attacked by the electrolyte used and must form a cell with a high instantaneous capacity but they do not have to have the quality of resisting anodic solutions to as great an extent as is necessary for the positive electrode. $E^8$ indicates the electrolyte in the individual cells.

Referring now to Figure 3 F indicates a source of alternating current and $F^1$ a transformer for securing the desired voltage. $F^2$ is a rectifier adapted to permit the passage of current through it in one direction only, thereby causing a pulsating direct current to flow in the secondary coil $F^3$ of the transformer $F^1$. $E^{10}$ generally indicates an electrolytic condenser, for example such as shown in Figures 1, 2 or 3, and herein shown as consisting of the four cells $A^2$, $A^3$, $A^4$ and $A^5$, connected across the output of the secondary coil $F^3$ and the rectifier $F^2$.

G indicates a choke coil having a high reactance by comparison to its resistance, connected in series with the load diagrammatically illustrated as $G^1$. The terminals $B^4$ $B^4$ should be connected respectively to the wires H and $H^{10}$ leading to the rectifier $F^2$ and the choke coil respectively. The opposite terminals $B^5$ $B^5$ should be connected respectively to the wires $H^1$ and $H^{12}$ connecting with the secondary coil $F^3$ and the load $G^4$ respectively, the load and the choke coil being connected by the line $H^2$ in the circuit as diagrammatically shown in Figure 3, and the rectifier $F^2$ and the coil $F^3$ being connected by the wire $H^3$.

It will be realized that whereas I have illustrated and described a practical and operative device and circuit, that nevertheless many changes may be made without departing from the spirit of my invention, and particularly that I do not wish to be limited to any specific use for my cell or my circuit since the cell may be used in other circuits or for other purposes. Furthermore both cell and circuit may be widely varied without departing from the spirit and intention of my invention. I wish my drawings and description therefore to be taken as in a broad sense illustrative and diagrammatic rather than as limiting me to my precise showing.

The use and operation of my invention are as follows:

My electro-chemical condenser has characteristics which radically differentiate it both from condensers and from batteries. All electrolytic condensers in the past have included positive plates, generally of metal, upon whose surface was formed a layer or film of a relatively non-conducting oxide or hydroxide which served to insulate the conducting surface of the electrode from the electrolyte. This film is capable of withstanding voltages very much in excess of the solution pressure voltages of the electrodes in conjunction with the specific electrolyte. A basicly novel feature of my condenser as disclosed herein and in the copending application 101,347, above mentioned, is the employment, as a positive electrode in an electrolytic condenser, of a metallic surface which does not become covered with a non-conducting oxide film and in which the break-down voltage is not greatly in excess of the solution pressure of the electrode against the solution.

I may employ a cell composed of a metallic nickel positive electrode and a metallic iron negative electrode. These electrodes have solid surfaces which will not have associated with them any substantial amount of material which can react with the electrolyte to produce a current on discharge. When such a cell is charged the charge consists of a certain electrical capacity associated with the plate similar to that possessed by an ordinary condenser together with a certain solution pressure due to a concentration of oxygen and hydrogen in the surface of the positive and negative electrodes respectively. It is difficult to say just what portion of the total capacity possessed by such a cell is due to the solution pressure of the gas acting as a gas battery and what portion is due to the electrical capacity of the electrode in the ordinary sense of the word. But regardless of this point, the fact remains that my electrolytic condenser functions as a condenser of very high capacity, fulfills the requirements of a condenser and is more similar to a condenser than to other commercial devices and that it will not function as a battery to an extent which justifies the classification of it as a battery.

In the appended claims I describe the positive electrodes or the positive electrode of my electrolytic condenser as one having a metallic surface. I wish to here define clearly what is meant by the term "metallic surface" in the appended claims. Such a surface as I describe may consist of a sheet or layer of metal regardless of the exact form or contour of the surface as long as the surface is metallic within the limits of my definition. The surface may be perforated, roughened, corrugated, or may be made porous to increase its area. It may also become covered during the normal operation of the device by a superficial film of oxide which is non-conducting and which has substantially no effect on the operation of the device, it being desirable from the point of view of my invention to prevent as far as possible the formation of an oxide film of appreciable thickness. There is a tendency in the case of iron for the surface of a positive electrode to become blackened, or oxidized, but nickel remains bright, never changing any more than to assume a slight brownish tint. I wish it clearly understood that when I describe a "metallic surface" I intend the term to include the metal even after such superficial discoloration or oxidation has occurred in use. I also use the term "metallic surface" to differentiate from previous types of electrolytic condenser the positive plate of which becomes covered with a film of a non-conducting oxide, hydroxide or other salt, which insulates the electrode from the electrolyte and by virtue of which the said electrolytic condenser functions. I also use the term "metallic surface" to differentiate my invention from such devices as the Edison storage battery which employs a nickel-plated container for the active material of the positive electrode, the active material of the electrode being the oxide or hydroxide contained within the case and not the metal of the case.

In my condenser the capacity increases with the voltage up to a certain voltage. Somewhat above this voltage the cell allows current to flow through it, the energy of which is represented by free oxygen and hydrogen gas which is not absorbed by the plates but rises in bubbles and is lost.

It is extremely important, to insure durability, that the electrolyte should not act chemically upon the electrodes either during use or disuse. All metals of the iron group become highly passive in alkaline electrolytes and in this condition are very little affected by the electrolysis. This is particularly true of nickel when employed as the positive electrode. After very long periods of continuous operation as an anode in potassium hydroxide, nickel is apparently unaffected.

The number of compartments or cells necessary for a complete condenser is determined by the voltage of the circuit across which the condenser is employed. The size of compartments and the area of electrodes in contact with the electrolyte may be increased as larger capacity is needed. For such circuits as shown in Figure 4 a voltage of about one and one-half volts per cell has proved advantageous for certain applications.

It will appear from the foregoing that my invention provides a cheap, durable and efficient condenser capable of providing extremely large capacities in relatively small dimensions, particularly adapted to low voltage applications and to the smoothing of pulsating currents.

I claim:

1. In an electrolytic condenser adapted for use in electric circuits carrying alternating or pulsating currents, which includes electrodes and an electrolyte, a bi-polar metallic electrode having opposite faces, one of metallic nickel and the other of metallic iron.

2. In an electrolytic condenser adapted for use in electric circuits carrying alternating or pulsating currents, which includes electrodes and an electrolyte, a bi-polar metallic electrode having opposite metallic faces, the one which serves as positive containing an effective proportion of metallic nickel.

3. In an electrolytic condenser adapted for use in electric circuits carrying alternating or pulsating currents, which includes electrodes and an electrolyte, a bi-polar electrode in the form of a thin flat sheet of metal, one exposed face being of metallic nickel and the other of metallic iron.

4. In an electrolytic condenser adapted for use in electric circuits carrying alternating or pulsating currents, which includes electrodes and an electrolyte, a bi-polar electrode in the form of a thin sheet of metal, one exposed face being of metallic nickel and the other of metallic iron.

5. In an electrolytic condenser adapted for use in electric circuits carrying alternating or pulsating currents, which includes electrodes and an electrolyte, a bi-polar metallic electrode having opposite faces, one of said faces consisting of metallic nickel.

6. In an electrolytic condenser adapted for use in electric circuits carrying alternating or pulsating currents, which includes electrodes and an electrolyte, a bi-polar metallic electrode having opposite faces, one of which acts as a positive electrode and the other as a negative electrode, the face acting as a positive electrode being of metallic nickel.

7. In an electrolytic condenser adapted for use in electric circuits carrying alternating or pulsating currents, which includes electrodes and an electrolyte, a metallic iron bi-polar electrode having opposite faces, one positive and the other negative, said positive face being covered by a closely adherent electrolytic deposit of metallic nickel.

8. An electrolytic condenser adapted for use in electric circuits carrying alternating and pulsating currents, including a plurality of cells separated by bi-polar electrodes having opposite faces, one of said faces forming the positive electrode in one cell, the other of said faces forming the negative electrode in an adjacent cell, said positive face being of metallic nickel.

9. In an electrolytic condenser adapted for use in electric circuits carrying alternating and pulsating currents, which includes electrodes and an electrolyte, a bi-polar electrode in the form of a thin sheet of metal, one face of said sheet being formed of the metal of which the sheet is composed, the opposite face being formed of a thin superposed layer of another metal, the metal constituting the positive electrode being nickel.

10. In an electrolytic condenser adapted for use in electric circuits carrying alternating or pulsating currents which includes electrodes and an electrolyte, a by-polar electrode in the form of a thin sheet of metal, said sheet including adherent layers of two different metals, one exposed face of the sheet being of one metal and the other of the other metal, the metal constituting the positive electrode being nickel.

11. In an electrolytic condenser adapted for use in electric circuits carrying alternating or pulsating currents which includes electrodes and an electrolyte, a positive electrode having an effective surface of metallic nickel and a negative electrode having an effective surface of metallic iron.

12. In an electrolytic condenser adapted for use in electric circuits carrying alternating or pulsating currents which includes electrodes and an electrolyte, an electrode having an effective surface of metallic nickel and an electrode having an effective surface of metallic iron.

Signed at Chicago county of Cook and State of Illinois, this 21st day of February, 1927.

EDWARD F. ANDREWS.